(12) United States Patent
Shah et al.

(10) Patent No.: US 9,077,552 B2
(45) Date of Patent: **\*Jul. 7, 2015**

(54) METHOD AND SYSTEM FOR NIC-CENTRIC HYPER-CHANNEL DISTRIBUTED NETWORK MANAGEMENT

(71) Applicant: Broadcom Corporation, Irvine, CA (US)

(72) Inventors: Hemal Shah, Tabucco Canyon, CA (US); Burhan Masood, Irvine, CA (US); Frankie Fan, Diamond Bar, CA (US); Robert Lusinsky, Anaheim Hills, CA (US); Vijay Sagar, San Fransicso, CA (US)

(73) Assignee: Broadcom Corporation, Irvine, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/731,194

(22) Filed: Dec. 31, 2012

(65) Prior Publication Data

US 2013/0124709 A1    May 16, 2013

Related U.S. Application Data

(63) Continuation of application No. 12/714,604, filed on Mar. 1, 2010, now Pat. No. 8,346,899.

(51) Int. Cl.
*G06F 15/173* (2006.01)
*G06F 15/16* (2006.01)
*H04L 12/24* (2006.01)
*H04L 12/931* (2013.01)

(52) U.S. Cl.
CPC .............. *H04L 12/24* (2013.01); *H04L 49/357* (2013.01); *H04L 49/65* (2013.01)

(58) Field of Classification Search
CPC ........ H04L 12/24; H04L 49/357; H04L 49/65
USPC .......................................... 709/201, 223–225
See application file for complete search history.

(56) References Cited

U.S. PATENT DOCUMENTS

| | | | |
|---|---|---|---|
| 5,206,933 A * | 4/1993 | Farrell et al. | .................. 709/250 |
| 5,555,244 A | 9/1996 | Gupta et al. | |
| 6,775,230 B1 | 8/2004 | Watanabe et al. | |
| 7,779,178 B2 | 8/2010 | Sarangam et al. | |
| 8,346,899 B2 | 1/2013 | Shah et al. | |
| 2002/0087727 A1 * | 7/2002 | Tawil et al. | .................. 709/245 |
| 2004/0030766 A1 | 2/2004 | Witkowski | |
| 2006/0230180 A1 | 10/2006 | Sahara et al. | |
| 2008/0301332 A1 | 12/2008 | Butler et al. | |

OTHER PUBLICATIONS

Chinese Office Action in co-pending related Chinese Patent Application No. 201110048579.5 mailed Apr. 22, 2013.
EPO Communication dated Aug. 1, 2011 in Application No. 11001313.3-2416 (4 pages).

\* cited by examiner

*Primary Examiner* — Minh-Chau Nguyen
(74) *Attorney, Agent, or Firm* — Oblon, McClelland, Maier & Neustadt, L.L.P.

(57) ABSTRACT

Various embodiments for hyper-channel management are disclosed. One such method is implemented by a network interface controller (NIC) residing in a server. This method involves determining a network component that is operable to create, modify, terminate, or any combination thereof, a hyper-channel. The hyper-channel corresponds to a logical abstraction of network resources associated with the server. The method also involves using the determined network component to manage the hyper-channel.

20 Claims, 5 Drawing Sheets

METHOD AND SYSTEM FOR NIC-CENTRIC HYPER-CHANNEL DISTRIBUTED NETWORK MANAGEMENT

CROSS-REFERENCE TO RELATED APPLICATIONS/INCORPORATION BY REFERENCE

This application is a continuation of application Ser. No. 12/714,604, filed Mar. 1, 2010, which is hereby incorporated herein in its entirety.]

FIELD OF THE INVENTION

Certain embodiments of the invention relate to data communications. More specifically, certain embodiments of the invention relate to a method and system for NIC-centric hyper-channel distributed network management.

BACKGROUND OF THE INVENTION

A network fabric or fabric refers to networking topology in which network nodes or resources such as, for example, web servers, application servers and/or database servers connect with each other via one or more switches such as, for example, blade switches and/or top of rack (TOR) switches. The network fabric interfaces with a network infrastructure or network cloud such as, for example, an Internet network through an edge of the network.

Each network node or server may have a network interface controller (NIC) resident in the network node or server. A network interface controller such as, for example, an Ethernet controller handles an interface to the network fabric and allows the network node or server to access the network fabric and/or the network cloud. The NIC has a multiple access control (MAC) address which identifies the device uniquely on the network.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for NIC-centric hyper-channel distributed network management, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for NIC-centric hyper-channel distributed network management. In various embodiments of the invention, a server which comprises a network interface controller (NIC) may be operable to determine network components and/or resources that may be utilized to create, modify and/or terminate a hyper-channel, which spans from the NIC to an edge of network in a network fabric. The hyper-channel is a logical abstraction of network components and/or resources that are associated with an operating system (OS) and/or a virtual machine (VM) of the server on a path connecting the OS and/or the VM to the external network cloud. The NIC in the server may be utilized to manage the hyper-channel. In this regard, the network fabric may comprise one or more switches. The NIC may be utilized by the server to initiate a configuration for creating, modifying and/or terminating the hyper-channel based on knowledge of the network fabric up to the edge of network. Each of the switches along a path of the hyper-channel may be instructed by the server utilizing the NIC to configure the hyper-channel. A configuration for creating, modifying and/or terminating the hyper-channel may also be initiated by the server utilizing the NIC based on knowledge of the network fabric up to a first hop. Each of the switches along a path of the hyper-channel may then be allowed to configure the hyper-channel based on knowledge of the network fabric surrounding each of the switches.

The server may be operable to receive network fabric management information from a remote management console. The hyper-channel may be managed based on the received network fabric management information. In this regard, the received network fabric management information may be communicated with the NIC for managing the hyper-channel utilizing, for example, a baseboard management controller (BMC) in the server in an operating system (OS)-absent environment. The received network fabric management information may also be communicated with the NIC utilizing, for example, an agent in the server. The network fabric management information may be received, for example, by the NIC directly from the remote management console.

The server may also be operable to receive network fabric management information from a local management console for managing the hyper-channel. In this regard, the received network fabric management information may be communicated with the NIC for managing the hyper-channel utilizing, for example, a BMC in the server. The network fabric management information may also be communicated with the NIC utilizing, for example, an agent in the server.

Figure 1:
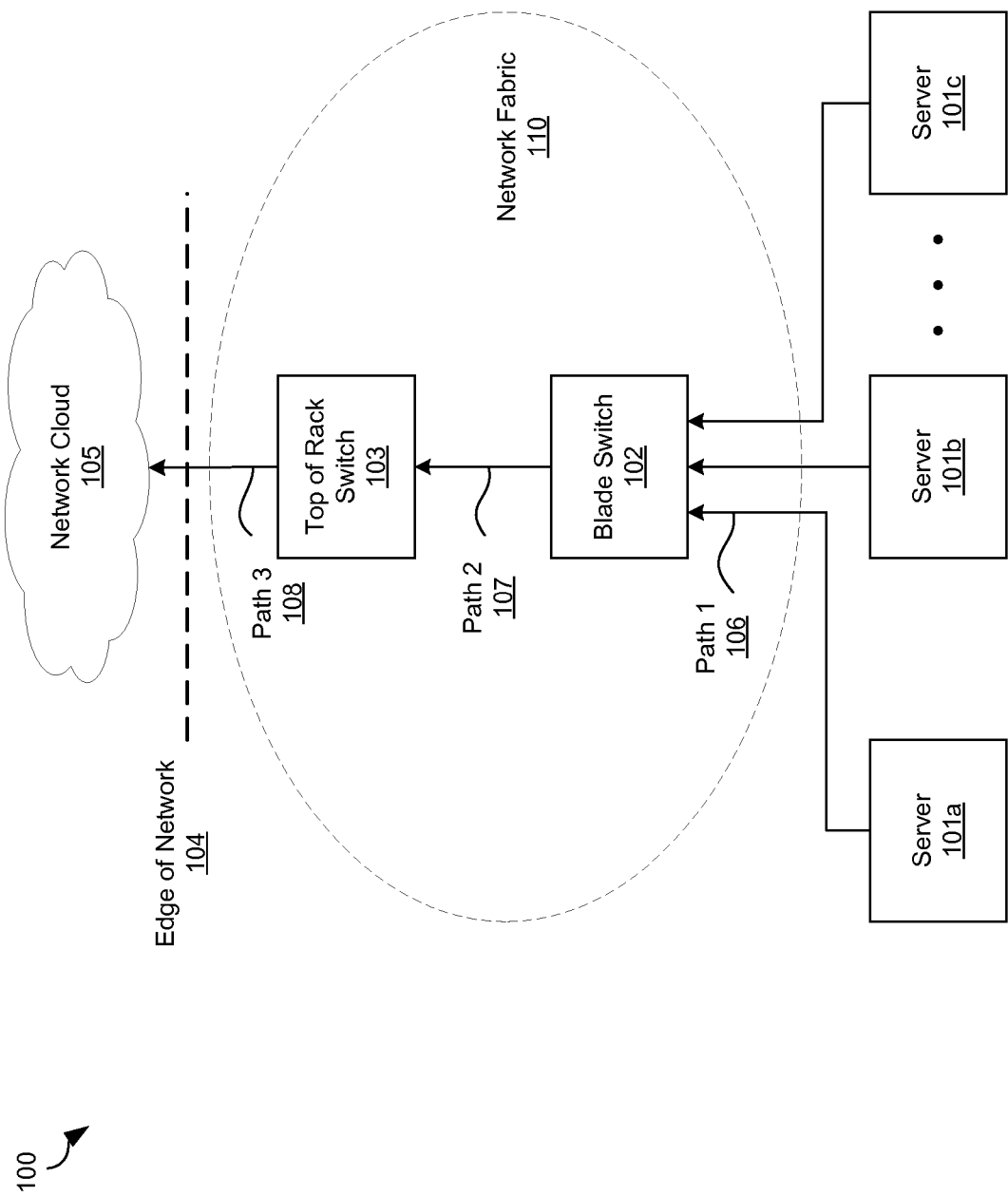
FIG. 1 is a block diagram illustrating an exemplary data communication system that is operable to provide NIC-centric hyper-channel distributed network management, in accordance with an embodiment of the invention.

FIG. 1 is a block diagram illustrating an exemplary data communication system that is operable to provide NIC-centric hyper-channel distributed network management, in accordance with an embodiment of the invention. Referring to FIG. 1, there is shown a data communication system 100. The data communication system 100 may comprise a plurality of servers such as, for example, server 101*a*, server 101*b* and server 101c, a network fabric 110, an edge of network 104 and a network cloud 105. The network fabric 110 may comprise, for example, a blade switch 102 and a top of rack switch 103. A path 1 106, a path 2 107 and a path 3 108 are also shown in the network fabric 110 to illustrate a hyper-channel. In the exemplary embodiment of the invention illustrated in FIG. 1, one blade switch 102 and one top of rack switch 103 are shown in the network fabric 110. Notwithstanding, the invention is not so limited and the numbers and the types of the switches may be different.

The server such as, for example, the server 101a may comprise suitable logic, circuitry, interfaces and/or code that may be operable to manage network resources and provide services on a network or data communication system. The server 101a may be, for example, a file server, a database server, a web server and/or an e-mail server. The server 101a may comprise a NIC which may allow the server 101a to access the network fabric 110 via, for example, the path 1 106.

The server 101a may be operable to determine network components and resources that may be utilized to create, modify and/or terminate a hyper-channel spanning from the NIC in the server 101a up to the edge of network 104. A hyper-channel as a logical abstraction of network components and resources may be managed as a single entity or domain. Attributes of the hyper-channel may comprise, for example, network traffic priority, access control list (AOL), bandwidth, virtual LAN (VLAN) identifier, and/or quality of service (QOS). In an exemplary embodiment of the invention, the NIC in the server 101a may have knowledge of the network fabric 110 up to the edge of network 104 such as, for example, on the path 1 106, the path 2 107 and the path 3 108. Based on this knowledge, the NIC in server 101a may be utilized to initiate a configuration for creating, modifying and/or terminating the hyper-channel and instruct switches such as, for example, the blade switch 102 and the top of rack switch 103 along the path 1 106, the path 2 107 and the path 3 108 to configure the hyper-channel. In this regard, the NIC in the server 101a may be utilized to set network configurations for network components and/or resources along the path 1 106, the path 2 107 and the path 3 108 up to the edge of network 104 to establish the hyper-channel.

In another exemplary embodiment of the invention, the NIC in the server 101a may only have knowledge of the network fabric 110 up to the first hop such as, for example, the knowledge of the network fabric 110 on the path 1 106. A switch along a path of the hyper-channel may have knowledge of the network fabric 110 surrounding the switch. For example, the blade switch 102 may have the knowledge of the network fabric 110 on the path 1 106 and the path 2 107, and the top of rack switch 103 may have the knowledge of the network fabric 110 on the path 2 107 and the path 3 108. The NIC in the server 101a may be utilized to initiate a configuration for creating, modifying and/or terminating the hyper-channel based on the knowledge on the path 1 106. The blade switch 102 may be allowed to configure the hyper-channel based on the knowledge on the path 1 106 and the path 2 107, and the top of rack switch 103 may be allowed to configure the hyper-channel based on the knowledge on the path 2 107 and the path 3 108. In this regard, the NIC in the server 101a may be utilized to propagate the network configuration along the path up to the edge of network 104 to establish the hyper-channel and each component along the path may be operable to configure the hyper-channel based on the knowledge of the surrounding network fabric 110.

The blade switch 102 may comprise suitable logic, circuitry, interfaces and/or code that may be operable to forward and route data in a network such as the network fabric 110 and may reside in a blade enclosure. The blade switch 102 may be instructed by the NIC in the server 101a to configure the hyper-channel. The blade switch 102 may be allowed, by the NIC in the server 101a, to configure the hyper-channel based on, for example, the knowledge of the network fabric 110 on the path 1 106 and the path 2 107.

The top of rack switch 103 may comprise suitable logic, circuitry, interfaces and/or code that may be operable to forward and route data in a network such as the network fabric 110 and may be placed at a top of a rack in a rack cabinet. The top of rack switch 103 may be instructed by the NIC in the server 101a to configure the hyper-channel. The top of rack switch 103 may be allowed, by the NIC in the server 101a, to configure the hyper-channel based on, for example, the knowledge of the network fabric 110 on the path 2 107 and the path 3 108.

The edge of network 104 may comprise suitable logic, circuitry, interfaces and/or code that may be operable to provide interface between the network cloud 105 and the top of rack switch 103 in the network fabric. The primary roles of the edge of network 104 may comprise, for example, policy enforcement, service availability, security, service virtualization and/or performance optimization.

The network cloud 105 may comprise suitable logic, circuitry, interfaces and/or code that may be operable to provide data communication via wired and/or wireless technologies. The network cloud 105 such as, for example, the Internet network may interface with the top of rack switch 103 in the network fabric 110 through the edge of network 104.

In operation, the server 101a may be operable to determine network components and/or network resources that may be utilized to create, modify and/or terminate a hyper-channel, which may span from the NIC in the server 101a up to the edge of network 104. In instances when the NIC in the server 101a may have knowledge of the network fabric 110 up to the edge of network 104 such as, for example on the path 1 106, the path 2 107 and path 3 108, the NIC may be utilized to initiate configuration for creating, modifying and/or terminating the hyper-channel. The NIC may be utilized to instruct network components and/or network resources along the path of the hyper-channel such as, for example, the blade switch 102 and the top of rack switch 103 to configure the hyper-channel. In instances when the NIC in the server 101a may only have knowledge of the network fabric 110 up to the first hop such as, for example, the knowledge on the path 1 106, the NIC may be utilized to initiate a configuration for creating, modifying and/or terminating the hyper-channel based on the knowledge on the path 1 106. The blade switch 102 may then be enabled to configure the hyper-channel based on the knowledge of the network fabric 110 on the path 1 106 and the path 2 107, and the top of rack switch 103 may be enabled to configure the hyper-channel based on the knowledge of the network fabric 110 on the path 2 107 and the path 3 108.

Figure 2:
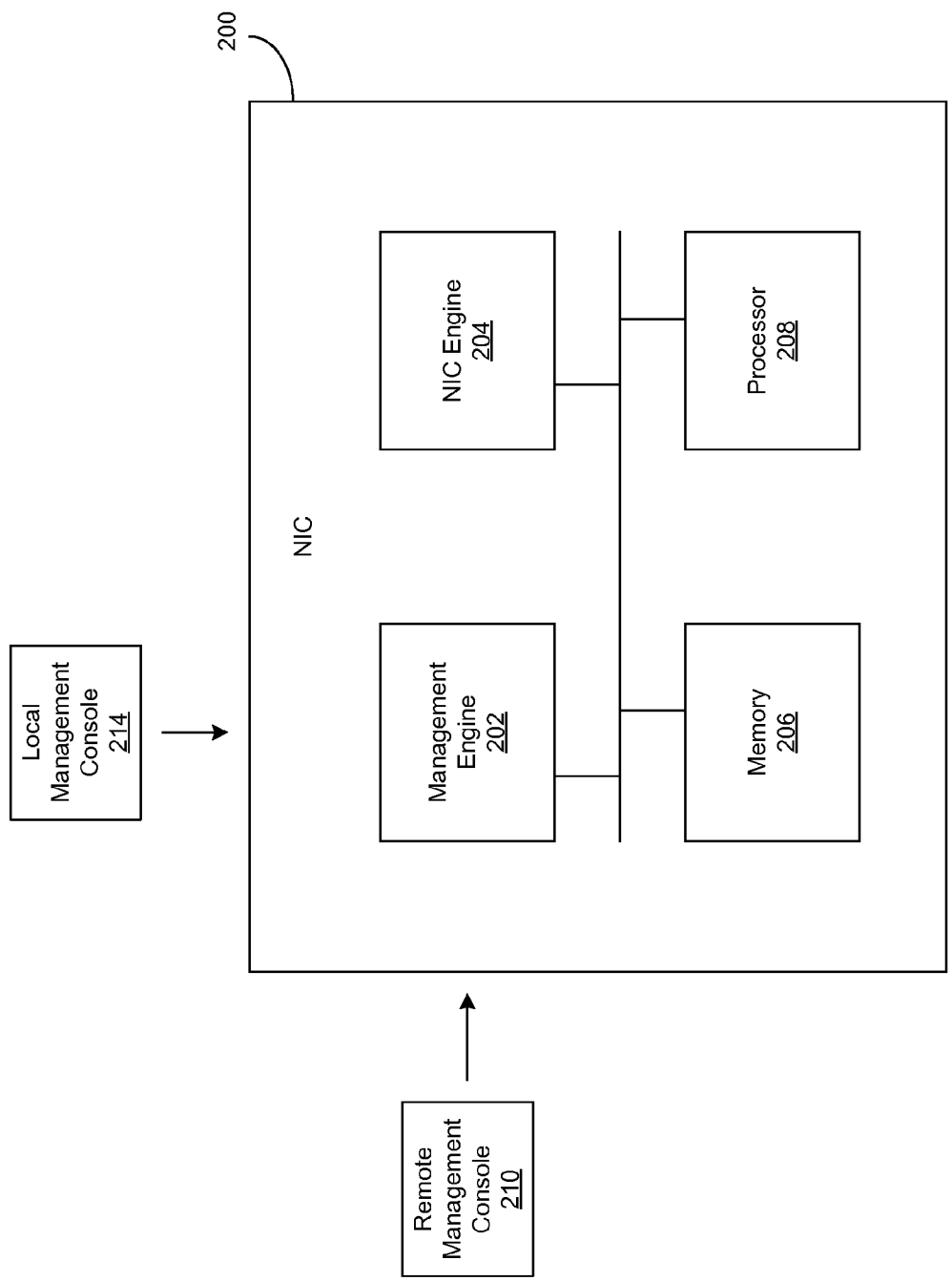
FIG. 2 is a block diagram illustrating an exemplary NIC in a server that is operable to provide NIC-centric hyper-channel distributed network management, in accordance with an embodiment of the invention.

FIG. 2 is a block diagram illustrating an exemplary NIC in a server that is operable to provide NIC-centric hyper-channel distributed network management, in accordance with an embodiment of the invention. Referring to FIG. 2, there is shown a NIC 200, a remote management console 210 and a local management console 214. The NIC 200 is located in a server such as, for example, in the server 101a described with respect to FIG. 1. The NIC 200 may comprise a management engine 202, a NIC engine 204, a memory 206 and a processor 208.

The management engine 202 may comprise suitable logic, circuitry, interfaces and/or code that may be operable to control, manage and/or configure the hyper-channel. The management engine 202 may communicate with the NIC engine 204 to enforce, maintain and/or manage the hyper-channel configured by the management engine 202.

In an exemplary embodiment of the invention, the management engine 202 may have knowledge of the network fabric up to the edge of network. The management engine 202 may be operable to initiate configuration for creating, modifying and/or terminating the hyper-channel and instruct switches along a path of the hyper-channel to also assist with the configuration of the hyper-channel. In another exemplary embodiment of the invention, the management engine 202 may only have knowledge of the network fabric up to the first hop and a switch along a path of the hyper-channel may have knowledge of the network fabric surrounding the switch. In this regard, the management engine 202 may be operable to initiate configuration for creating, modifying and/or terminating the hyper-channel based on the knowledge of the network fabric up to the first hop and each switch along a path of the hyper-channel may be enabled to configure the hyper-channel based on the knowledge of the surrounding network fabric.

Network fabric management information for managing the hyper-channel may be generated by a remote management console such as the remote management console 210 and/or a local management console such as the local management console 214. The management engine 202 may be operable to acquire the network fabric management information generated by the remote management console 210 and/or the local management console 214 for managing the hyper-channel.

The NIC engine 204 may comprise suitable logic, circuitry, interfaces and/or code that may be operable to provide resources for transmitting, receiving and/or filtering data packets. The NIC engine 204 may be operable to enforce, maintain and/or manage the hyper-channel configured by the management engine 202.

The memory 206 may comprise suitable logic, circuitry, interfaces and/or code that may be operable to store information such as executable instructions and data that may be utilized by the processor 208. The memory 206 may comprise RAM, ROM, low latency nonvolatile memory such as flash memory and/or other suitable electronic data storage.

The processor 208 may comprise suitable logic, circuitry, interfaces and/or code that may be operable to process network data. The processor 208 may be operable to communicate with the management engine 202 and the NIC engine 206 to perform the hyper-channel network management.

The remote management console 210 may comprise suitable logic, circuitry, interfaces and/or code that may be operable to remotely manage a server such as, for example, the server 101a in which the NIC 200 is located. The remote management console 210 may be operable to provide network fabric management information to the management engine 202 for managing the hyper-channel.

The local management console 214 may comprise suitable logic, circuitry, interfaces and/or code that may be operable to locally manage a server such as, for example, the server 101a in which the NIC 200 is located. The local management console 314 may be operable to provide network fabric management information to the management engine 202 for managing the hyper-channel.

In operation, the management engine 202 may be operable to initiate configuration for creating, modifying and/or terminating the hyper-channel based on the knowledge of the network fabric up to the edge of network and instruct network components and/or network resources such as the switches along the path of the hyper-channel to configure the hyper-channel. In instances when the management engine 202 may only have knowledge of the network fabric up to the first hop and a switch along the path of the hyper-channel may have knowledge of the network fabric surrounding the switch, the management engine 202 may be operable to initiate a configuration for creating, modifying and/or terminating the hyper-channel based on the knowledge of the network fabric up to the first hop. Each network component and/or network resource such as a switch along the path of the hyper-channel may be enabled to configure the hyper-channel based on the knowledge of the surrounding network fabric. The network fabric management information, which may be generated by either the remote management console 210 or the local management console 214 for managing the hyper-channel may be acquired by the management engine 202. The NIC engine 204 may be operable to enforce, maintain and/or manage the hyper-channel configured by the management engine 202.

Figure 3A:
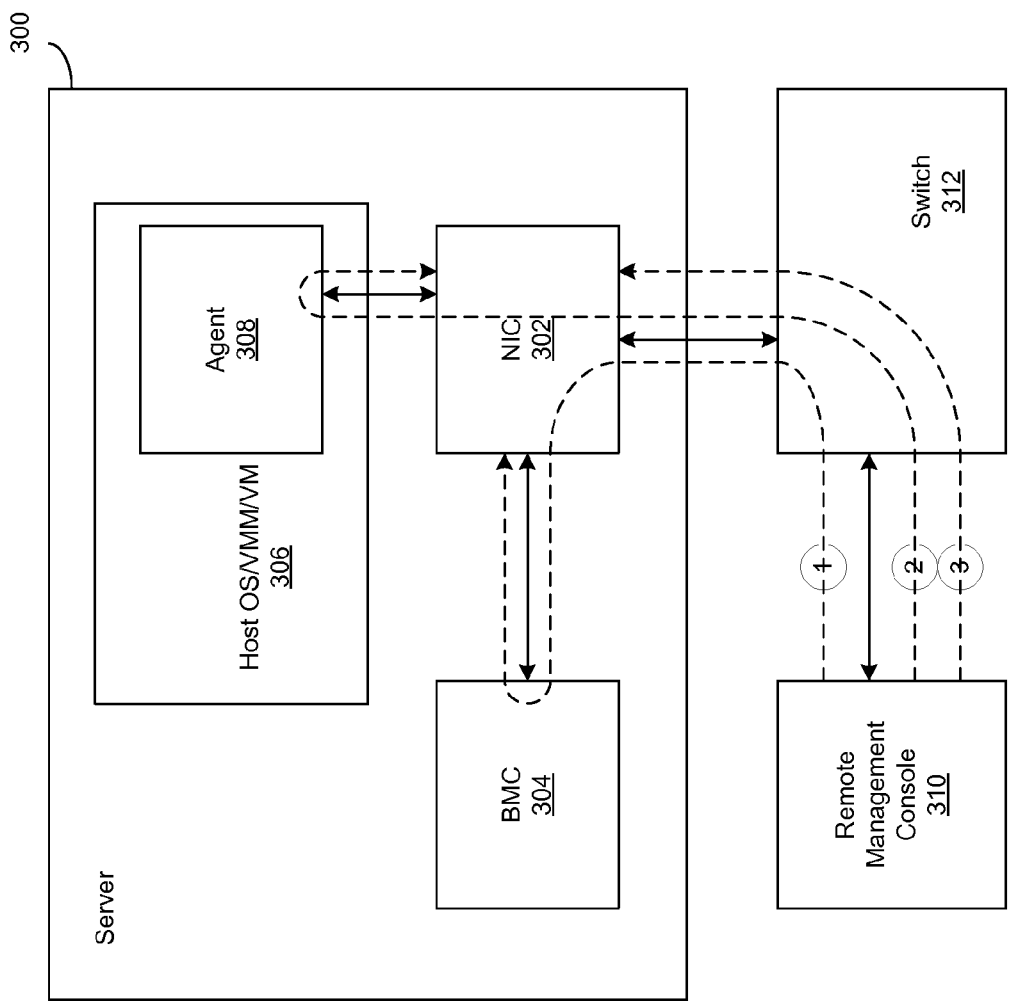
FIG. 3A is a block diagram illustrating an exemplary server with a remote management console that is operable to provide NIC-centric hyper-channel distributed network management, in accordance with an embodiment of the invention.

FIG. 3A is a block diagram illustrating an exemplary server with a remote management console that is operable to provide NIC-centric hyper-channel distributed network management, in accordance with an embodiment of the invention. Referring to FIG. 3A, there is shown a server 300, a remote management console 310 and a switch 312. The server 300 may comprise a NIC 302, a BMC 304 and an agent 308 running on a host operating system or a virtual machine monitor or a virtual machine (OS/VMM/VM) 306.

The NIC 302 may comprise suitable logic, circuitry, interfaces and/or code that may be operable to provide an interface to the network fabric 110 and allow the server 300 to access the network fabric 110 and/or the network cloud 105. The NIC 302 may communicate with, for example, the switch 312 in the network fabric 110.

The NIC 302 may be operable to acquire network fabric management information from, for example, the remote management console 310 for managing or configure a hyper-channel utilizing, for example, the BMC 304 independent of the host OS/VMM/VM 306 as illustrated by the reference label 1. The network fabric management information may be acquired by the NIC 302 from the remote management console 310 utilizing, for example, an agent 308 running on the host OS/VMM/VM 306 as illustrated by the reference label 2. The network fabric management information may also be acquired by the NIC 302, for example, directly from the remote management console 310 as illustrated by the reference label 3.

The BMC 304 may comprise suitable logic, circuitry, interfaces and/or code that may be operable to manage an interface between system management software and platform hardware of the server 300. The BMC 304 is the intelligence in an intelligent platform management interface (IPMI) architecture or a system management architecture for server hardware (SMASH) utilizing an out-of-band management. The BMC 304 may operate independent of the host OS/VMM/VM 306 and may provide the remote management console 310 with the ability to manage the server 300 even in instances when the host OS/VMM/VM 306 has become inoperable or the server 300 is powered down. In this regard, the BMC 304 may be operable to receive network fabric management information from, for example, the remote management console 310 in an OS-absent environment and communicate the received network fabric management information with the NIC 302 for managing a hyper-channel as illustrated by the reference label 1.

The host OS/VMM/VM 306 may comprise suitable logic, circuitry, interfaces and/or code that may be operable to provide an interface between hardware and users of the server 300. The host OS/VMM/VM 306 may be responsible for the management and coordination of activities and the sharing of the resources of the server 300 that acts as a host for computing applications that run on the server 300. The host OS/VMM/VM 306 may be operable to provide the interface between the agent 308 and the NIC 302 for managing a hyper-channel as illustrated by the reference label 2.

The agent 308 may comprise suitable logic, circuitry, interfaces and/or code that may be operable to perform information gathering and/or processing tasks in a background environment. The agent 308, running on the host OS/VMM/VM 306 may be operable to receive network fabric management information from, for example, the remote management console 310 and communicate the received network fabric management information with the NIC 302 for managing a hyper-channel as illustrated by the reference label 2.

The remote management console 310 may comprise suitable logic, circuitry, interfaces and/or code that may be operable to manage such as, for example, monitor and/or configure the server 300 remotely. The remote management console 310 may communicate with the server 300 via, for example, the switch 312 in a network such as the network fabric 110. The remote management console 310 may be operable to provide network fabric management information to the NIC 312 for managing a hyper-channel as illustrated by the reference labels 1, 2, and 3.

The switch 312 may be similar or substantially the same as the blade switch 102 or the top of rack switch 103 described with respect to FIG. 1. The switch 312 may be operable to provide an interface between the remote management console 310 in a network and the server 300 for managing a hyper-channel as illustrated by the reference labels 1, 2, and 3.

In operation, the NIC 302 may be operable to acquire network fabric management information from, for example, the remote management console 310 for managing or configure a hyper-channel utilizing, for example, the BMC 304 in an OS-absent environment. The network fabric management information may be acquired by the NIC 302 from the remote management console 310 utilizing, for example, an agent 308 running on the host OS/VMM/VM 306. The network fabric management information may also be acquired by the NIC 302, for example, directly from the remote management console 310.

Figure 3B:
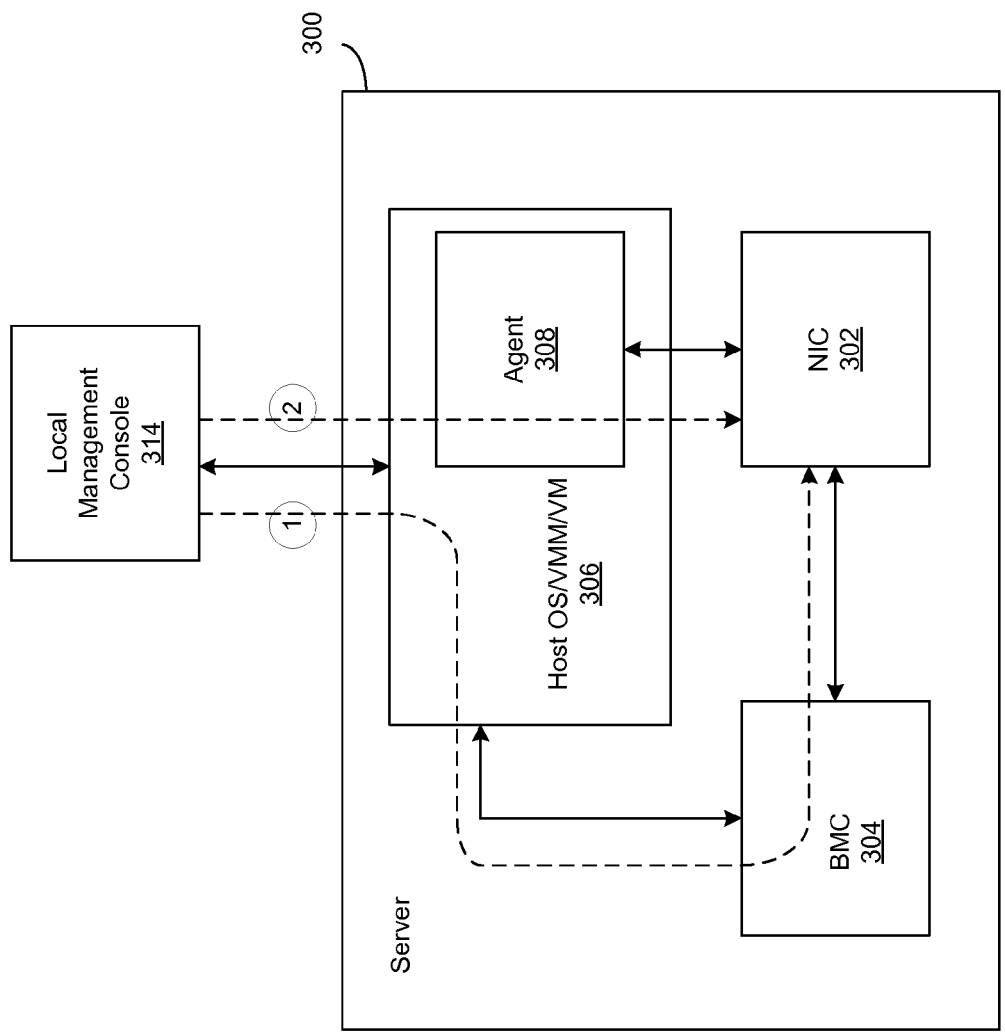
FIG. 3B is a block diagram illustrating an exemplary server with a local management console that is operable to provide NIC-centric hyper-channel distributed network management, in accordance with an embodiment of the invention.

FIG. 3B is a block diagram illustrating an exemplary server with a local management console that is operable to provide NIC-centric hyper-channel distributed network management, in accordance with an embodiment of the invention. Referring to FIG. 3B, there is shown a server 300 and a local management console 314. The server 300 may comprise a NIC 302, a BMC 304 and an agent 308 running on a host OS/VMM/VM 306. The NIC 302, the BMC 304, the host OS/VMM/VM 306 and the agent 308 may be substantially the same as the NIC 302, the BMC 304, the host OS/VMM/VM 306 and the agent 308 described with respect to FIG. 3A.

The NIC 302 may be operable to acquire network fabric management information from, for example, the local management console 314 for managing and/or configuring a hyper-channel utilizing, for example, the BMC 304 as illustrated by the reference label 1. The network fabric management information may also be acquired by the NIC 302 from the local management console 314 utilizing, for example, the agent 308 running on the host OS/VMM/VM 306 as illustrated by the reference label 2.

The local management console 314 may comprise suitable logic, circuitry, interfaces and/or code that may be operable to manage such as, for example, monitor and/or configure the server 300 locally. The local management console 314, which may be running on the host OS/VMM/VM 306, for example, may be operable to provide network fabric management information to the NIC 302 for managing the hyper-channel through, for example, either the BMC 304 or the agent 308 as illustrated by the reference labels 1 and 2.

In operation, the NIC 302 may be operable to acquire network fabric management information from, for example, the local management console 314 for managing and/or configuring the hyper-channel utilizing, for example, the BMC 304. The network fabric management information may also be acquired by the NIC 302 from the local management console 314 utilizing, for example, the agent 308 running on the host OS/VMM/VM 306.

Figure 4:
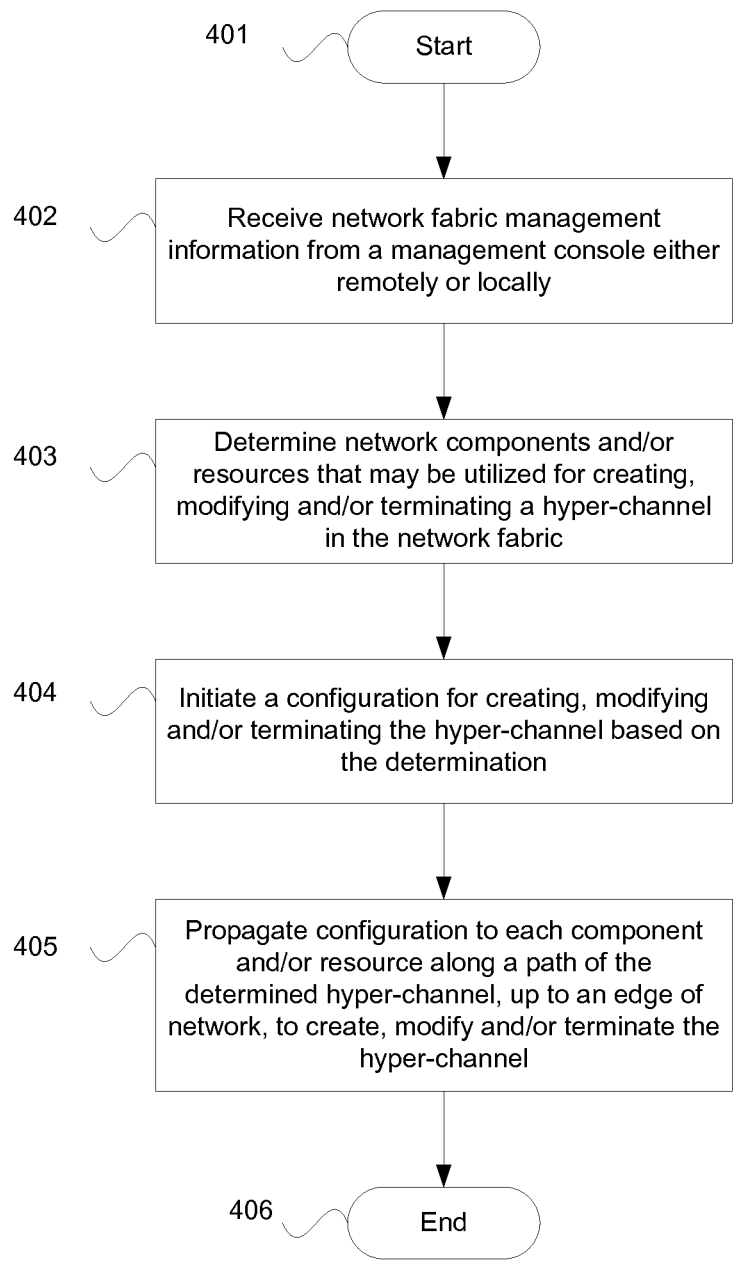
FIG. 4 is a flow chart illustrating exemplary steps for NIC-centric hyper-channel distributed network management, in accordance with an embodiment of the invention.

FIG. 4 is a flow chart illustrating exemplary steps for NIC-centric hyper-channel distributed network management, in accordance with an embodiment of the invention. Referring to FIG. 4, the exemplary steps start at step 401. In step 402, the NIC 302 in the server 300 may be operable to receive network fabric management information from a management console either remotely or locally. In step 403, the received network fabric management information may be utilized by the NIC 302 to determine network components and/or resources that may be utilized for creating, modifying and/or terminating a hyper-channel in the network fabric. In step 404, the NIC 302 may be operable to initiate a configuration for creating, modifying and/or terminating the hyper-channel based on the determination. In step 405, the NIC 302 may propagate the configuration to each component and/or resource along a path of the determined hyper-channel, up to an edge of network, to create, modify and/or terminate the hyper-channel. The exemplary steps may proceed to the end step 406.

In various embodiments of the invention, a server 300 which comprises a NIC 302 may be operable to determine network components and/or resources that may be utilized to create, modify and/or terminate a hyper-channel, which spans from the NIC 302 to an edge of network in a network fabric 104. The NIC 302 in the server 300 may be utilized to manage the hyper-channel. In this regard, the network fabric 110 may comprise one or more switches 102, 103. The NIC 302 may be utilized by the server 300 to initiate a configuration for creating, modifying and/or terminating the hyper-channel based on knowledge of the network fabric 110 up to the edge of network 104. Each of the switches 102, 103 along a path of the hyper-channel may be instructed by the NIC 302 in the server 300 to configure the hyper-channel. A configuration for creating, modifying and/or terminating the hyper-channel may also be initiated by the NIC 302 based on knowledge of the network fabric 110 up to a first hop. Each of the switches 102, 103 along a path of the hyper-channel may then be allowed to configure the hyper-channel based on knowledge of the network fabric 110 surrounding each of the switches 102, 103.

The server 300 may be operable to receive network fabric management information from a remote management console 310. The hyper-channel may be managed based on the received network fabric management information. In this regard, the received network fabric management information may be communicated with the NIC 302 for managing the hyper-channel utilizing, for example, a BMC 304 in the server 300 in an OS-absent environment. The received network fabric management information may also be communicated with the NIC 302 utilizing, for example, an agent 308 in the server 300. The network fabric management information may be received, for example, by the NIC 302 directly from the remote management console 310.

The server 300 may also be operable to receive network fabric management information from a local management console 314 for managing the hyper-channel. In this regard, the received network fabric management information may be communicated with the NIC 302 for managing the hyper-channel utilizing, for example, a BMC 304 in the server 300. The network fabric management information may also be communicated with the NIC 302 utilizing, for example, an agent 308 in the server 300.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for NIC-centric hyper-channel distributed network management.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a network interface controller (NIC) residing in a server:
   determining a network component that is operable to create, modify, terminate, or any combination thereof, a hyper-channel, wherein the hyper-channel corresponds to a logical abstraction of network resources associated with the server;
   initiating a configuration to create, modify, terminate, or any combination thereof, the hyper-channel based on the determined network component; and
   propagating the configuration to the network component along the logical abstraction of network resources so as to create, modify, terminate, or any combination thereof, the hyper-channel.

2. The method according to claim 1, further comprising:
   in the NIC:
   receiving network fabric management information from a remote management console; and
   managing the hyper-channel utilizing the determined network component and based on the received network fabric management information.

3. The method according to claim 2, further comprising:
   in the NIC:
   obtaining the received network fabric management information from a baseboard management controller (BMC) in the server.

4. The method according to claim 2, further comprising:
   in the NIC:
   obtaining the received network fabric information from an agent in the server.

5. The method according to claim 2, wherein the network fabric management information for managing the hyper-channel is received by the NIC directly from the remote management console.

6. The method according to claim 1, wherein
   the server is operable to execute an operating system (OS) or a virtual machine (VM), and
   the hyper-channel further corresponds to a logical abstraction of resources associated with the OS, the VM, or both.

7. The method according to claim 1, wherein the hyper-channel spans from the NIC up to an edge between a network fabric and a network cloud.

8. The method according to claim 1, further comprising:
   managing the hyper-channel utilizing the determined network component by using the determined network component to manage network traffic priority, an access control list (AOL), bandwidth, a virtual LAN (VLAN) identifier, quality of service (QOS), or any combination thereof.

9. The method according to claim 1, wherein
   the logical abstraction of network resources include at least one switch along a path of the hyper-channel,
   the initiating the configuration to create, modify, terminate, or any combination thereof, the hyper-channel is based on knowledge of a network fabric up to an edge between the network fabric and a network cloud, and
   the method further comprising in the NIC:
   instructing the at least one switch to configure the hyper-channel.

10. The method according to claim 1, wherein
    the logical abstraction of network resources include a plurality of switches along a path of the hyper-channel,
    the initiating the configuration to create, modify, terminate, or any combination thereof, the hyper-channel is based on knowledge of a network fabric up to a first hop, and
    the method further comprising in the NIC:
    allowing at least one of the switches to configure the hyper-channel based on knowledge of the network fabric surrounding each of the switches.

11. A system comprising:
    a network interface controller (NIC) operable to:
    determine a network resource that is operable to create, modify, terminate, or any combination thereof, a hyper-channel, wherein the hyper-channel corresponds to a logical abstraction of network resources associated with a server that is in communication with the NIC;
    initiating a configuration to create, modify, terminate, or any combination thereof, the hyper-channel based on the determined network component; and
    propagating the configuration to the network component along the logical abstraction of network resources so as to create, modify, terminate, or any combination thereof, the hyper-channel.

12. The system according to claim 11, wherein the NIC is further operable to:
   receive network fabric management information from a local management console; and
   manage the hyper-channel utilizing the determined network component and based on the received network fabric management information.

13. The system according to claim 12, wherein the NIC is further operable to:
   communicate the received network fabric management information utilizing a BMC in the server.

14. The method according to claim 12, wherein the NIC is further operable to:
   communicate the received network fabric management information utilizing an agent in the server.

15. A system comprising:
   a network interface controller (NIC) operable to:
      obtain management information associated with a plurality of switches in a network fabric; and
      manage a hyper-channel based on the management information corresponding to switches up to an edge between the network fabric and a network cloud, wherein
   the hyper-channel corresponds to a logical abstraction of network resources associated with a server that is in communication with the NIC, and
   the management of the hyper-channel based on the management information includes
      initiating a configuration to create, modify, terminate, or any combination thereof, the hyper-channel based on a network component identified in the management information; and
      propagating the configuration to the network component along the logical abstraction of network resources so as to create, modify, terminate, or any combination thereof, the hyper-channel.

16. The system according to claim 15, wherein
   the network fabric includes at least one switch along a path of the hyper-channel, and
   the NIC is further operable to
      initiate the configuration of the hyper-channel based on knowledge of the network fabric up to the edge; and
      instruct the at least one switch to configure the hyper-channel.

17. The system according to claim 15, wherein
   the network fabric includes a plurality of switches along a path of the hyper-channel, and
   the NIC is further operable to:
      initiate configuration of the hyper-channel based on knowledge of the network fabric up to a first hop; and
      allow at least one of the switches to configure the hyper-channel based on knowledge of the network fabric surrounding each of the switches.

18. The system according to claim 15, wherein the NIC is further operable to:
   receive, from a remote management console, the management information associated with the network fabric; and
   manage the hyper-channel based on the received management information.

19. The system according to claim 15, wherein the NIC is further operable to:
   receive, from a local management console, the management information associated with the network fabric; and
   manage the hyper-channel based on the received management information.

20. The system according to claim 15, wherein the NIC is further operable to obtain the management information from a baseboard management controller (BMC) residing in the server or from an agent residing in the server.

* * * * *